3,298,811
PREPARATION OF CERIUM-CONTAINING GLASSES
Charles R. Kurkjian, Basking Ridge, and Arnold W. Treptow, Fanwood, N.J., assignors to Bell Telephone Laboratories, Incorporated, New York, N.Y., a corporation of New York
Filed Apr. 23, 1963, Ser. No. 274,996
2 Claims. (Cl. 65—117)

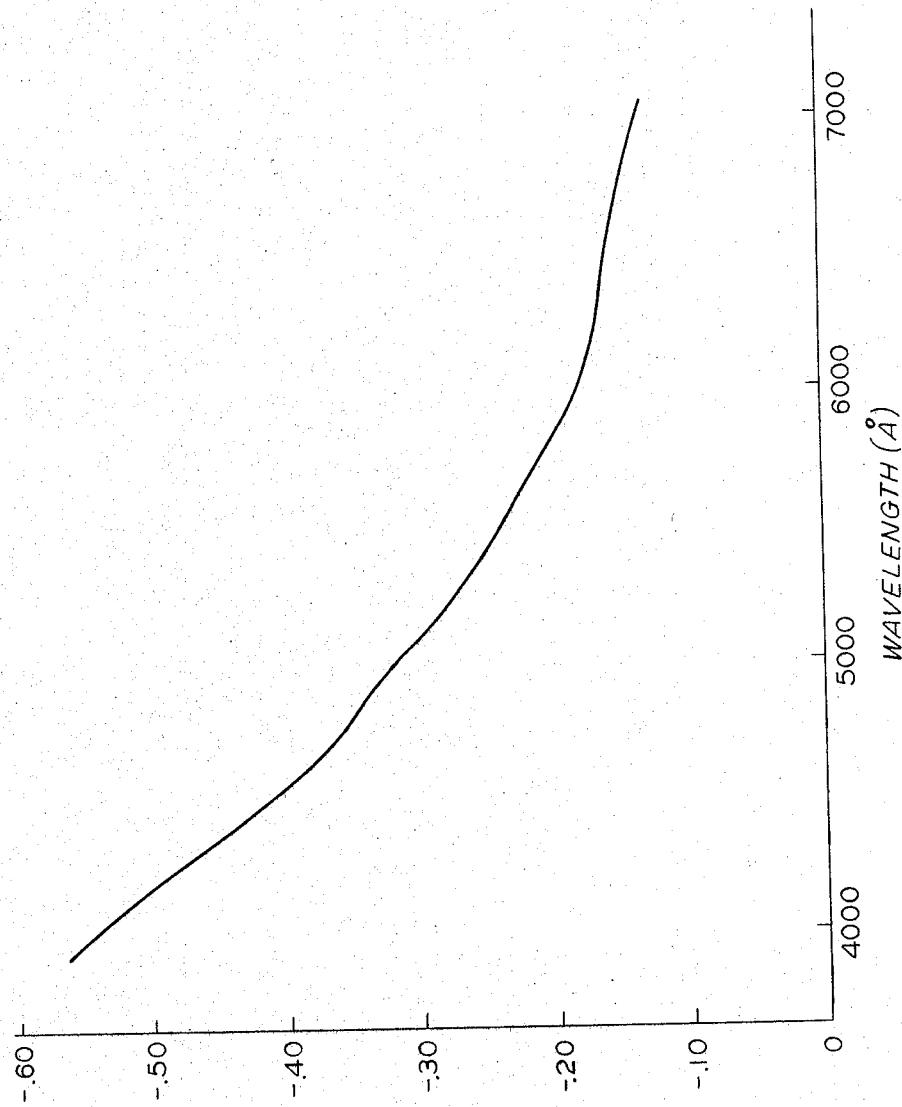

This invention relates to the preparation of glasses and more specifically to the preparation of certain glass systems containing significant amounts of the rare earth, cerium.

The optical property of Faraday rotation has been observed in a cerium-containing phosphate glass. This property is of considerable interest particularly in the design of optical device components for systems using coherent light. Practical consideration of such systems is made possible by the now well known optical maser, or laser, described and claimed in United States Patent 2,929,922, issued Mar. 22, 1960. A compatible light rotating device is described and claimed in United States Patent 2,974,568, issued Mar. 14, 1961. The Faraday rotation effect can be used for a variety of devices such as modulators, isolators, circulators and gyrators all of which have analogous counterparts in the microwave transmission art.

The intense interest in Faraday rotating materials has generated a need for effective methods for their preparation. Particular problems arise in connection with the preparation of cerium-containing glasses. The useful light-rotating property of cerium is attributable to its plus three valence state. The presence of the ceric ion in a rotating medium detracts from the rotating ability. Since cerium is easily oxidized to the plus four state the preparation procedure must be carefully controlled to preserve the reduced state. The specific rotation of a cerium glass has been found to vary linearly with the concentration of cerium ion. However, with increasing amounts of the rare earth ion the glass becomes less stable. Thus the difficulty arises in obtaining stable glasses with high cerium content.

The present invention is directed to a technique for preparing cerium-containing glasses which substantially overcomes these and other difficulties. According to the invention cerium carbonate is combined with an ammonium phosphate and, as a preliminary step, the mixture is calcined to form a stable intermediate. The mixture is thereafter heated to above its melting point and cooled quickly. The entire operation is conducted under inert conditions to preserve the cerium in the plus three valence state.

The specific reactants prescribed have been found to be particularly advantageous in promoting a moderate reducing condition for the reaction. The presence of ammonia vapor from the decomposition of the ammonium phosphate, during heating and until the intermediate reaction is well underway, is especially helpful in this regard, whereas the evolution of ammonia serves to prevent atmospheric oxidation to some degree, it is preferred that an inert atmosphere be maintained over the reaction vessel. The term "inert atmosphere" has an established meaning in the art and comprehends such gases as nitrogen, argon and helium. More extreme reducing conditions are to be avoided since they promote the formation of elemental phosphorus which easily vaporizes and is lost to the reaction.

The calcining operation is conducted at a temperature approaching the solidus temperature of the mixture which prescribes an appropriate temperature range of 800° C. to 1200° C. The duration of the calcining operation to ensure the appropriate reaction is preferably at least 20 minutes. No advantage appears to be realized from extending this step longer than two hours. The mixture is then fired to a molten condition which for the compositions of this invention occurs at a temperature in the range of 1250° C. to 1700° C. Since the melting temperature varies with composition within this range, it is appropriate to express the preferred firing temperature as from 25 to 250° C. above the melting point of the reaction mixture. The firing step is also conducted in an inert atmosphere.

The melt must be cooled rapidly to prevent devitrification. This precaution becomes more critical as the concentration of cerium increases. This is conveniently achieved by removing the reaction vessel to a cool, neutral atmosphere and permitting the melt to cool to pouring viscosity, approximately 1000° C. to 1300° C., and then quenching the melt by pouring into a desired mold. Appropriate for this purpose is a thick-walled brass mold. The cool mold typically reduces the temperature of the melt to 600° C. in less than 30 seconds. The cooling period from the firing temperature to 600° C. should not exceed 60 seconds. The subsequent cooling to room temperature is not as critical.

The glass is thereafter annealed at a temperature of 450° C. to 650° C. for at least 15 minutes and cooled at a rate of less than 10° C./minute and preferably less than 5° C./minute. No advantage is seen in annealing for longer than one hour.

The following examples are submitted to illustrate the procedure of this invention.

EXAMPLE I 550.24 grams of $Ce_2(CO_3)_3 \cdot 5H_2O$ and 792.39 grams of $(NH_4)_2HPO_4$ were weighed and thoroughly mixed by dry ball milling. The mixture was then calcined in $N_2$ at 950° C. for 30 minutes. The calcined mixture was reground and again thoroughly mixed. This insures a uniform distribution of the reaction products of the calcining operation. The reground mixture was placed in a platinum crucible and fired at 1430° C. for 30 minutes. During this melting procedure it is important to maintain an inert atmosphere over the melt to prevent the oxidation of the desired $Ce^{+3}$. For this purpose the melting furnace was continuously flushed with nitrogen. Argon and helium, as well as other neutral gases, can be used alternatively. The melt was then cooled in situ to approximately 1150° C. and then poured into a brass mold. The mold consisted of heavy brass blocks arranged to form a cavity having a rectangular cross section. With this quench the melt cools to the vicinity of 600° C. in less than 30 seconds. Rapid cooling over this range is important to prevent devitrification. The melt then cools in the mold to room temperature in several minutes. The glass sample was then annealed at 550° C. for 30 minutes. The cooling schedule after anneal was approximately 2° C./minute and in all cases should be maintained at less than 5° C./minute to achieve the purpose of the anneal. The resulting glass was stable and optically transparent. The optical absorption at 7000 A. is approximately 0.08 db/cm.

The glass forming region in this system has been found to extend through the range 20 mole percent $Ce_2O_3$:80 mole percent $P_2O_5$ to 35 mole percent $Ce_2O_3$:65 mole percent. The ultimate composition is expressed in terms of these oxides since the reaction liberates the water of hydration and $CO_2$ from the cerium compound and water and ammonia from the phosphate ingredient according to the reaction:

$$Ce_2(CO_3)_3 \cdot 5H_2O + 6(NH_4)_2HPO_4 \overset{\Delta}{\longrightarrow}$$
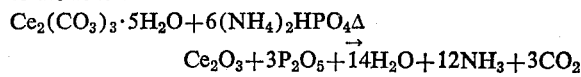
$$Ce_2O_3 + 3P_2O_5 + 14H_2O + 12NH_3 + 3CO_2$$

As is evident, this particular reaction yields a glass having the composition 25 mole percent $Ce_2O_3$:75 mole percent $P_2O_5$.

The mole ratios of initial reactants necessary to produce a glass composition falling within the prescribed range are 3.71 to 8 mole ratio of $(NH_4)_2HPO_4$ to $$Ce_2(CO_3)_3 \cdot 5H_2O$$

These mole ratios are valid also if monobasic ammonium phosphate is used rather than dibasic ammnoium phosphate. For the purposes of this description the term ammonium phosphate or basic ammonium phosphate is considered to include both of these compounds.

The rotating properties of a typical glass composition made according to the procedure of this invention are shown in the figure:

The figure is a plot of the Verdet constant vs. wavelength for a glass sample having the composition: 25 mole percent $Ce_2O_3$:75 mole percent $P_2O_5$. The Verdet constant is an accepted measure of the light rotating properties of magnetic materials. It is expressed in units of minutes of arc rotation per centimeter-oersted. The measurements used in obtaining this data were done with a sample approximately 3 mm. in length and a field value of 7250 oersteds. A further discussion of the significance of the Verdet constant and procedures for its measurement will be found in "Theory of Electric and Magnetic Susceptibilities," J. H. Van Vleck, Oxford University Press (1932).

The magnitude of the Verdet constants evident from the figure will immediately suggest the suitability of the glasses made according to this invention for various optical devices including that described in United States Patent 2,974,568, issued March 14, 1961.

Various other modifications and extensions of this invention will become apparent to those skilled in the art. All such variations and deviations which basically rely on the teachings through which this invention has advanced the art are properly considered within the spirit and scope of this invention.

What is claimed is:
1. A method for making a cerium-containing glass which consists essentially of forming a mixture of basic ammonium phosphate and cerous carbonate in a mole ratio of phosphate to carbonate in the range of 3.71:1 to 8:1, calcining the resulting mixture at a temperature in the range 800° C. to 1200° C. for a period of at least 20 minutes, firing the calcined product at a temperature of 25° C. to 250° C. above the melting point of the aforesaid mixture for a period of 20 minutes to two hours, cooling the melted mixture to a temperature of approximately 600° C. over a period of not more than 60 seconds, and cooling the glass to room temperature.

2. The method of claim 1 wherein the glass is annealed at a temperature in the range 450° C. to 650° C. and cooled to room temperature at a rate of less than 10° C./min.

References Cited by the Examiner
UNITED STATES PATENTS

| | | | |
|---|---|---|---|
| 2,241,950 | 5/1941 | Huniger | 252—301.4 |
| 2,306,567 | 12/1942 | Roberts | 252—301.4 |
| 2,359,789 | 10/1944 | Pincus | 106—47 X |
| 2,393,469 | 1/1946 | Hooley | 252—201.4 X |
| 2,575,755 | 11/1951 | Froelich et al. | 252—301.4 |
| 2,835,636 | 5/1958 | Rimbach | 252—301.4 |
| 3,097,172 | 7/1963 | Ginther | 106—52 X |

DONALL H. SYLVESTER, *Primary Examiner.*
F. W. MIGA, *Assistant Examiner.*